United States Patent [19]

DeVane

[11] Patent Number: 5,187,676

[45] Date of Patent: Feb. 16, 1993

[54] HIGH-SPEED PSEUDO-RANDOM NUMBER GENERATOR AND METHOD FOR GENERATING SAME

[75] Inventor: Charles J. DeVane, Milford, Mass.

[73] Assignee: Digital Equipment Corporation, Maynard, Mass.

[21] Appl. No.: 724,531

[22] Filed: Jun. 28, 1991

[51] Int. Cl.$^5$ .............................................. G06F 1/02
[52] U.S. Cl. ................................................... 364/717
[58] Field of Search ........................... 364/717; 331/78

[56] References Cited

U.S. PATENT DOCUMENTS

| | | | |
|---|---|---|---|
| 4,998,263 | 3/1991 | Kendall et al. | 364/717 |
| 5,046,036 | 9/1991 | Tezuka | 364/717 |
| 5,079,733 | 1/1991 | Antoine et al. | 364/717 |

Primary Examiner—David H. Malzahn
Attorney, Agent, or Firm—Kenyon & Kenyon

[57] ABSTRACT

A high-speed pseudo-random number generator comprising a first shift register with p stages for storing and shifting a value with the least significant bit being adjacent an output terminal; a second shift register with b stages for storing and shifting a pre-loaded value with the least significant bit of the pre-loaded value being stored in the bth stage; a serial adder having at least 1 input taps with the serial adder adding the two values shifted out of the first and second shift registers and loading the sum output of the serial adder into the first shift register; and a controller for controlling clocking of the first and second shift registers and the serial adder, controlling pre-loading of the pre-load value into the second shift register, and clearing the serial adder.

14 Claims, 5 Drawing Sheets

HIGH-SPEED PSEUDO-RANDOM NUMBER GENERATOR AND METHOD FOR GENERATING SAME

FIELD OF THE INVENTION

The present invention relates to means for generating random numbers and, more particularly, to means for generating pseudo-random numbers in accordance with a linear congruent sequence.

BACKGROUND OF THE INVENTION

In development of electronic systems, it is necessary to test such systems under varying conditions to attempt to uncover system bugs. One method of doing this is to trigger certain repetitive transactions at slightly different timing to hopefully uncover problems that would not be uncovered if these transactions are triggered only with the same timing. Ideally, random trigger signals are used in diagnostics including design verification and testing, manufacturing, in-field testing, and repair testing. The use of random time intervals improves confidence in testing. However, it is difficult to generate truly random triggering.

FIG. 1 is a block diagram of a conventional system that is configured to trigger, for example, data transfer from one device to another. In FIG. 1, the system generally shown at 1 includes device I at 2, device II at 3, and pulse generator 5. Device I and Device II are connected by cable 4. Under normal circumstances, pulse generator 5 may be part of a microprocessor or central processing unit ("CPU") which will send a trigger signal to device I to transfer data to device II. The time that the data is sent will be a certain period of time after the trigger. If this period of time is fixed some system problems may be masked, so during system development, pulse generator 5 may be replaced with a pseudo-random pulse generator which will output a trigger signal to device I at slightly different times.

D. E. Knuth, "The Art of Computer Programming," Vol. 2, pp. 9, 10, 155, 156 [1969] discusses the implementation of programs by computers or microprocessors for generating pseudo-random numbers in accordance with a linear congruential sequence. According to that text, a pseudo-random number sequence will be obtained by using the following expression:

$$X_{n+1} = (aX_n + c) \bmod m \quad (1)$$

for $n \geq 0$ where,
$X_o$ = the starting value,
$a$ = the multiplier,
$c$ = the increment, and
$m$ = the modulus.

A flow diagram for determining such a pseudo-random number sequence according to expression (1) is shown at FIG. 2. At 7, the microprocessor initializes the variable $X_n$ to be equal to $X_0$. Next at 8, the microprocessor reads the modulus value m. Following this, at step 9, the microprocessor reads the multiplier value "a." The computer or microprocessor reads the increment value "c" at step 10, while at step 11, the microprocessor performs the calculation according to expression (1). The result of this calculation is a pseudo-random number in accordance with a linear congruential sequence.

The microprocessor at step 12 loads a hardware binary counter with the value computed at 11 and that value is allowed to count out. At 13, the microprocessor periodically checks the status of the counter to determine if the counter has finished counting the value loaded at 12. If the counter is not finished, the microprocessor executes a wait at step 14. When the counter is finished counting, the microprocessor sets the value of $X_n$ equal to the $X_{n+1}$ value at step 15. This value was previously calculated at step 11. Thereafter, the microprocessor repeats steps 11, 12, 13, 14, and 15.

The use of a microprocessor to calculate pseudo-random number sequences for testing purposes limits randomized testing to tests requiring a relatively low number of trigger events because random number generation is slow when a microprocessor is used so the time it takes to test devices is considerably long.

SUMMARY OF THE INVENTION

The present invention is for a high-speed system and method for generating pseudo-random numbers.

The pseudo-random number generator of the present invention includes a first shift register, a second shift register, a serial adder and a controller. The first shift register includes at least p stages for storing and shifting a predetermined value. The second shift register has b stages which are used for storing and shifting a preloaded value from the controller. The serial adder has at least l input taps for receiving the values shifted out of the first and second shift registers, and adding those values. The serial sum output from the serial adder is input to the first shift register as its new value. The controller controls clocking of the system components and controls loading the preload value into the second shift register.

In more detail, the first shift register has an input, an output, and a clock signal input. The least significant bit of the value loaded into the first shift register is adjacent the output terminal of that shift register.

The second shift register has an input, at least one output, a clock signal input, and a pre-load input. The least significant bit of the value stored in the second register is in the bth stage.

The serial adder has at least l input taps, an output, a clock input, and a clear input and an increment input. The output from the first register is input to the l input taps and the output of the second shift register is input to the b input taps of the serial adder.

The controller provides a number of signals to the system for controlling system operations. Accordingly, it provides a clear signal, clock signal, and increment signal of the serial adder. The first clock signal is input to the first and second shift registers, and serial adder for synchronizing their operations. In the embodiment that includes a counter, the controller provides a second clock signal to that counter for clocking it. In this embodiment the first and second clock signals are synchronized. As stated, it also provides the preload signal that is input to the second register.

According to an embodiment of the present invention, a value is loaded into the first shift register. This value is $X_n$ in expression (1). The value stored in the first shift register is multiplied by expression (2):

$$a = 1 + \sum_{i=1}^{b} 2^i f(i) \quad (2)$$

where,
- l = the number of input taps of the serial adder that are used.
- f(i) = 1 if stage $B_i$ is connected to the serial adder and f(i) = 0 otherwise, where $B_i$ is a stage of the second shift register means.

When the modulus and constant (or preload) values are applied to the serial adder, the result will be a pseudo-random value that may be used to generate a trigger signal.

The present invention also includes a method of generating a pseudo-random number sequence. The method includes loading the first shift register, generating a repeating clock signal, pre-loading a value in the second shift register, clearing a serial adder, serially shifting the lowest stage of the first shift register to the highest stage in the second shift register and to the l input taps of the serial adder. These steps of the method are carried out while outputting at least one stage of the secondary shift register to the b input taps of the serial adder. The method further includes adding the signals at the l input taps in the serial adder and outputting the result to the highest stage in the first shift register. This method is repeated for each of the p−1 clock cycles so that eventually the value in the first shift register is at least multiplied by the expression (2).

DESCRIPTION OF THE DRAWINGS

Reference will now be made in detail to the drawings that show the present invention.

Figure 1:
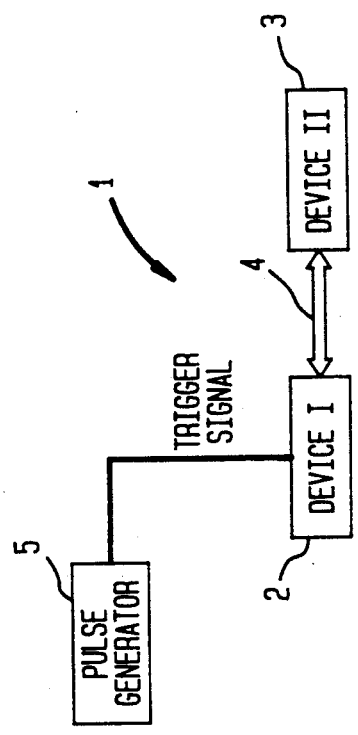
FIG. 1 shows a block diagram of prior art devices with a trigger signal.
Figure 2:
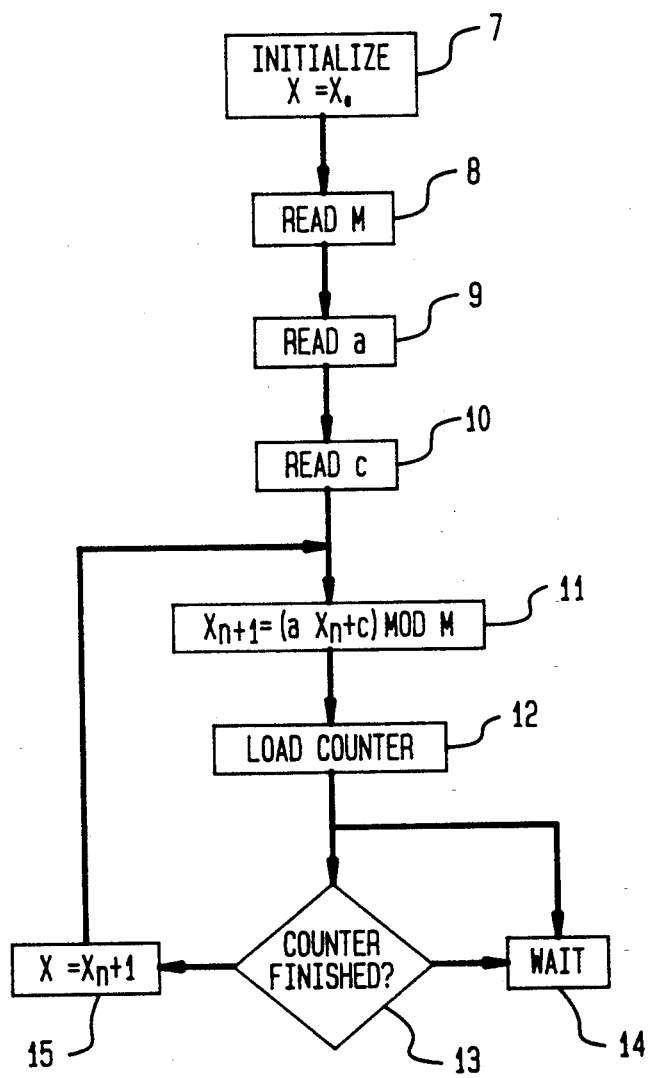
FIG. 2 is a flow diagram of a prior art pseudo-random clock generator using a pseudo-random number generator.
Figure 3:
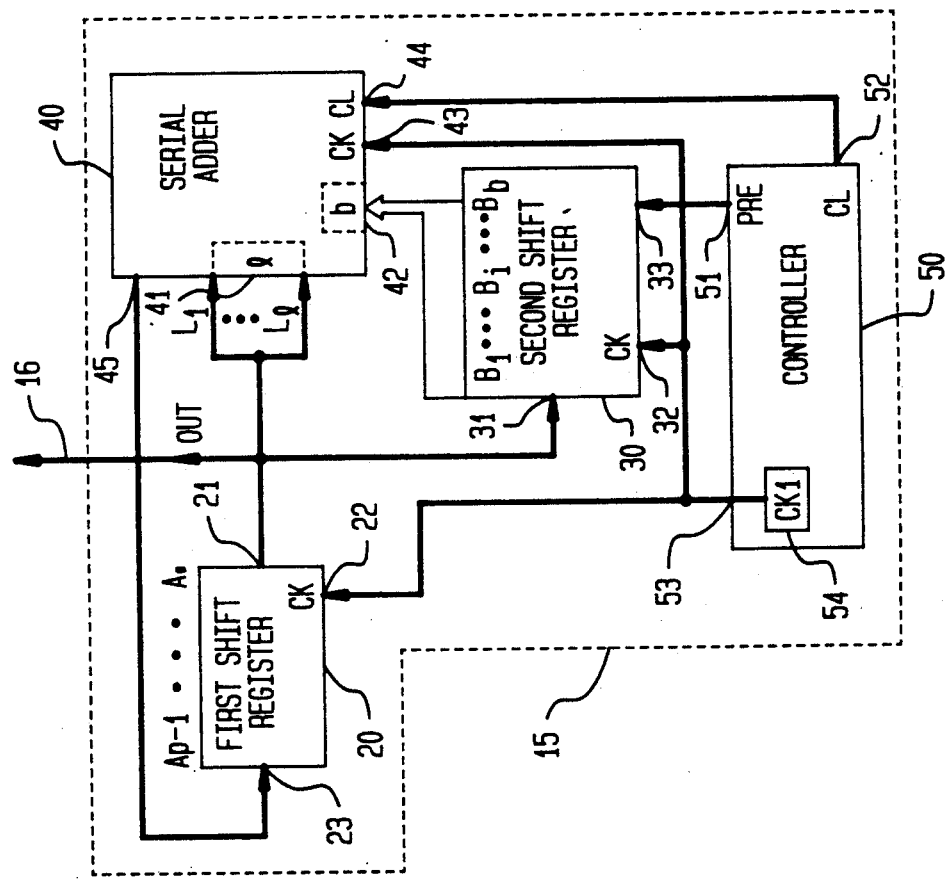
FIG. 3 is a schematic drawing of the pseudo-random number generator in accordance with a first embodiment of the present invention.

Referring to FIG. 3, a schematic diagram of the first embodiment of a pseudo-random number generator of the present invention is shown generally at 15. The pseudo-random number generator of the present invention includes first (or primary) shift register 20, second (or secondary) shift register 30, serial adder 40, and controller 50. First shift register 20 has p stages, $A_0$ to $A_{p-1}$. Stage $A_0$ contains the least significant bit ("LSB") of the value loaded in first shift register 20.

First shift register 20 has output terminal 21 which connects to the output terminal 16 of pseudo-random number generator 15, the l input taps of serial adder 40, and input 31 of second shift register 30. The LSB stored in stage $A_0$ of first shift register 20 is adjacent the output terminal 21, and the signal output from terminal 21 is taken from stage $A_0$.

Second shift register 30 has b stages, $B_1$ to $B_b$. The LSB of the value loaded in second shift register 30 is stored in stage $B_b$. The designation $B_i$ refers to any stage of second shift register 30 and i ranges from 1 to b.

Second shift register 30 has input terminal 31, clock input terminal 32, and pre-load input terminal 33. Second shift register 30 further includes at least one output terminal from stages $B_i$ to $B_b$. In the embodiment of the invention shown in FIG. 3, any one, or any combination, or all of the stages $B_i$ to $B_b$ may have output terminals that connect to b input taps of serial adder 40.

Serial adder 40 has l input taps 41 where l ≧ 0. It also has at least one input tap 42 that connects to at least one of the b stages of second shift register 30. Serial adder 40 may have up to b input taps to which the outputs from second shift register 30 connect. The number of input taps of the serial adder that are used depends on the number of stages of second shift register 30 designated to be connected to serial adder 40.

Serial adder 40 also includes clock signal input terminal 43 and clear input terminal 44. Serial adder 40 further includes an output terminal 45 which connects to input 23 of first shift register 20.

Controller 50 has pre-load output terminal 51, clear output terminal 52, and clock output terminal 53. The clock signal CK1 that is output from first clock 54 of controller 50 is used to synchronously clock first shift register 20, second shift register 30, and serial adder 40.

Output terminal 21 of first shift register 20 connects to input terminal 31 of second shift register 30. Output terminal 21 of first shift register 20 also connects to l input taps 41 of serial adder 40 via lines $L_1$ to $L_l$. As stated, output terminal 45 of serial adder 40 connects to input terminal 23 of first shift register 20.

Referring to controller 50 shown in FIG. 3, pre-load output terminal 51 connects to pre-load input terminal 33 of second shift register 30. Clear output terminal 52 of controller 50 connects to clear input terminal 44 of serial adder 40. First clock output terminal 53 of controller 50 for delivering the CK1 signal to first shift register 20, second shift register 30, and serial adder 40 connects to the clock inputs of these system elements.

Pseudo-random number generator 15 that is shown in FIG. 3 generates pseudo-random numbers in accordance with equation (1) which is repeated as following:

$$X_{n+1} = (aX_n + c) \bmod m \quad (1)$$

for n ≧ 0 where,
- $X_0$ = the starting value.
- a = the multiplier.
- c = the increment: PRE, the increment value for the second shift register.
- m = the modulus: $2^p$, with p being the number of stages of the first shift register.

The multiplier "a" in expression (1) is determined by expression (2) which also is repeated here as follows:

$$a = 1 + \sum_{i=1}^{b} 2^i f(i) \quad (2)$$

where,
- l = the number of input taps of the serial adder connected to the first shift register 20.
- f(i) = 1 if stage $B_i$ is connected to serial adder 40.
- = 0 otherwise, and
- $B_i$ = a stage of second shift register 30.

In operation, first clock 54 of controller 50 generates the clock signal CK1 which is output from clock output terminal 53 and input to first shift register 20, second shift register 30, and serial adder 40. Controller 50 at this time also outputs the PRE signal from terminal 51 which is input to shift register 30. The PRE signal represents the increment value "c" of expression (1) that is to be added by serial adder 40. Also at this time, controller 50 outputs a clear signal from clear output terminal 52 to clear serial adder 40.

When the CK1 signal clocks first shift register 20, second shift register 30, and serial adder 40, the following things occur. First shift register 20 shifts the LSB stored in the stage $A_0$ to the stage $B_1$ (the highest stage) of the second shift register 30 and to l input taps 41 of serial adder 40 via lines $L_1$ to $L_l$. Simultaneously, the values stored in the $B_1$ to $B_b$ stages of second shift register 30 are input to input taps 42 of serial adder 40.

Serial adder 40 performs addition of the signals at l input taps 41 and b input taps 42. The result is output from output terminal 45 and input to the highest stage $A_{p-1}$ of first shift register 20.

First shift register 20 is shifted p times in total such that all bits of the value stored in stages $A_0$ to $A_{p-1}$ are replaced with new data from serial adder 40. Thus, $p-1$ additional clock cycles are required to perform the operations of expression (1) above on the value in the first shift register.

In the above calculation, the length of first shift register 20 determines the modulus "m." The signal PRE from pre-load output terminal 51 of controller 50 determines the increment "c." The number of lines l, the number of stages b, and the connections of stages $B_1$ to $B_b$ of second shift register 30 determine the multiplier "a" as shown in expression (2) above.

The resulting value stored in first shift register 20 is a pseudo-random number $X_{n+1}$ generated in accordance with equation (1) above. The value stored in first shift register 20 now may be output as a trigger signal interval from output terminal 16 of the pseudo-random number generator 15.

The pseudo-random number generator 15 of FIG. 3 quickly generates pseudo-random numbers. Using a pseudo-random number generator according to this invention in testing a device significantly reduces the test time for the device since the pseudo-random numbers are generated at a quicker pace.

An example of pseudo-random number generation according to the first embodiment of this invention would be where expression (1) is used as following:

$$X_{n+1} = (5 * X_n + 3) \bmod 2^{16}$$

The values of $a=5$, $c=3$, and $m=2^{16}$ are selected for use in the equation immediately above and then implemented in the system of the present invention. This implementation is carried out as follows:

In order to set "a" equal to 5, the second stage $B_b$ of second shift register 30 connects to serial adder 40 and there is only 1 line, line $L_1$ that connects between first shift register 20 and serial adder 40. In order for $c=3$, the pre-load value of the PRE is set to binary 3 which is loaded in the second shift register by the $B_{b-1}$ and $B_b$ inputs.

In order to set the modulus m to $2^{16}$, first shift register 20 has 16 stages, so $p=16$. To optimize the statistical probabilities of the pseudo-random numbers being generated, the values a, c and m may be varied and the circuit illustrated in FIG. 3 may be modified.

Figure 4:
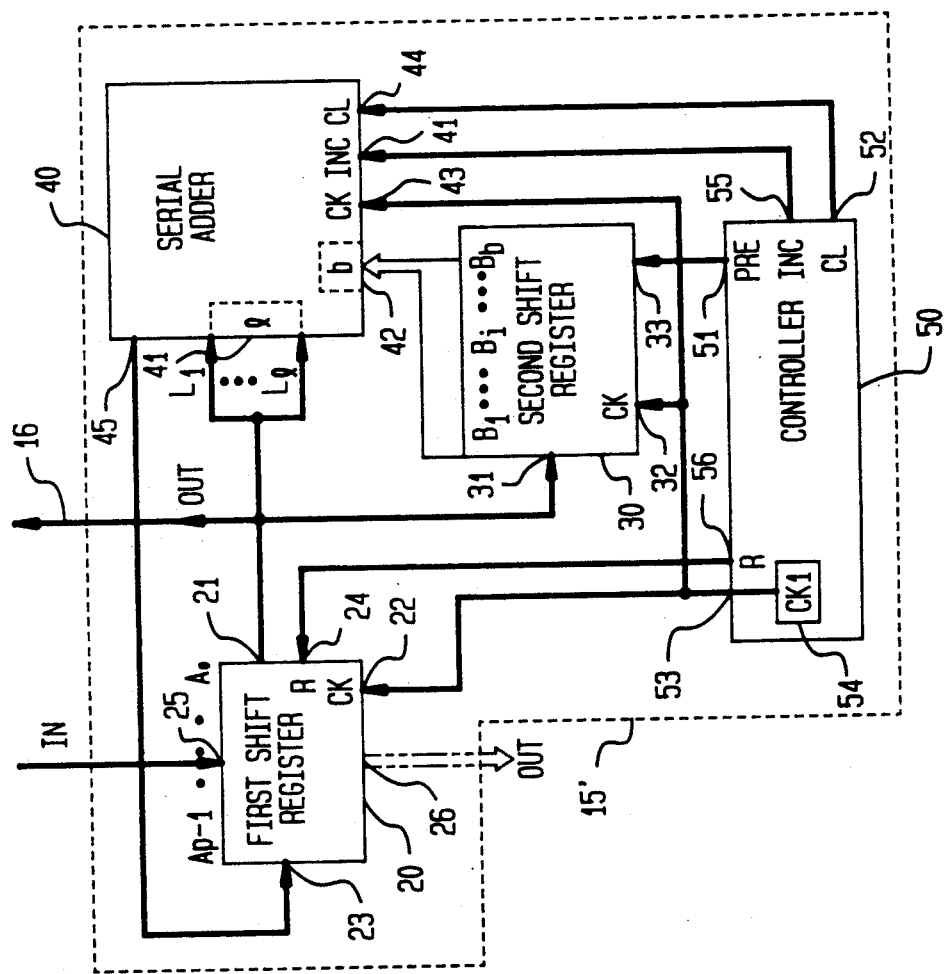
FIG. 4 is a schematic drawing of a pseudo-random number generator in accordance with a second embodiment of the present invention.

FIG. 4 is a pseudo-random number generator in accordance with a second embodiment of the invention. The pseudo-random number generator of FIG. 4 includes the same elements that are included in the first embodiment shown in FIG. 3. Hence, these items are identically numbered. The pseudo-random number generator 15' in FIG. 4 operates similar to the pseudo-random number generator 15 in FIG. 3. First shift register 20, however, includes reset input terminal 24 which connects to the reset output terminal 56 of controller 50. Controller 50 generates a reset signal which is output from terminal 56 and input to first shift register 20 to reset the first shift register to an initial value, $X_0$ of equation (1). The first shift register also may include a serial input terminal 25 for storing an initial value, $X_0$ in equation (1).

An alternative to output terminal 16 of pseudo-random number generator 15' is that first shift register 20 may include a p-wide parallel output terminals 26 for the output of the values stored in stages $A_0$ to $A_{p-1}$. The parallel output may be used to load a counter. In addition, the pre-load signal PRE generated by the controller 50 to pre-load the constant value in second shift register 30 may be a reset signal to reset second shift register 30 to a particular value.

As shown in FIG. 4, controller 50 has an increment signal output terminal 55 and serial adder 40 has an increment input tap 46. The generation of the increment signal INC may be an alternative or in addition to the generation of the pre-load signal PRE. The increment signal INC is added by the serial adder just as the pre-load signal PRE is added by the serial adder 40. Thus, in the embodiment of FIG. 4, the increment c is given by the following:

$$c = PRE + INC$$

Figure 5:
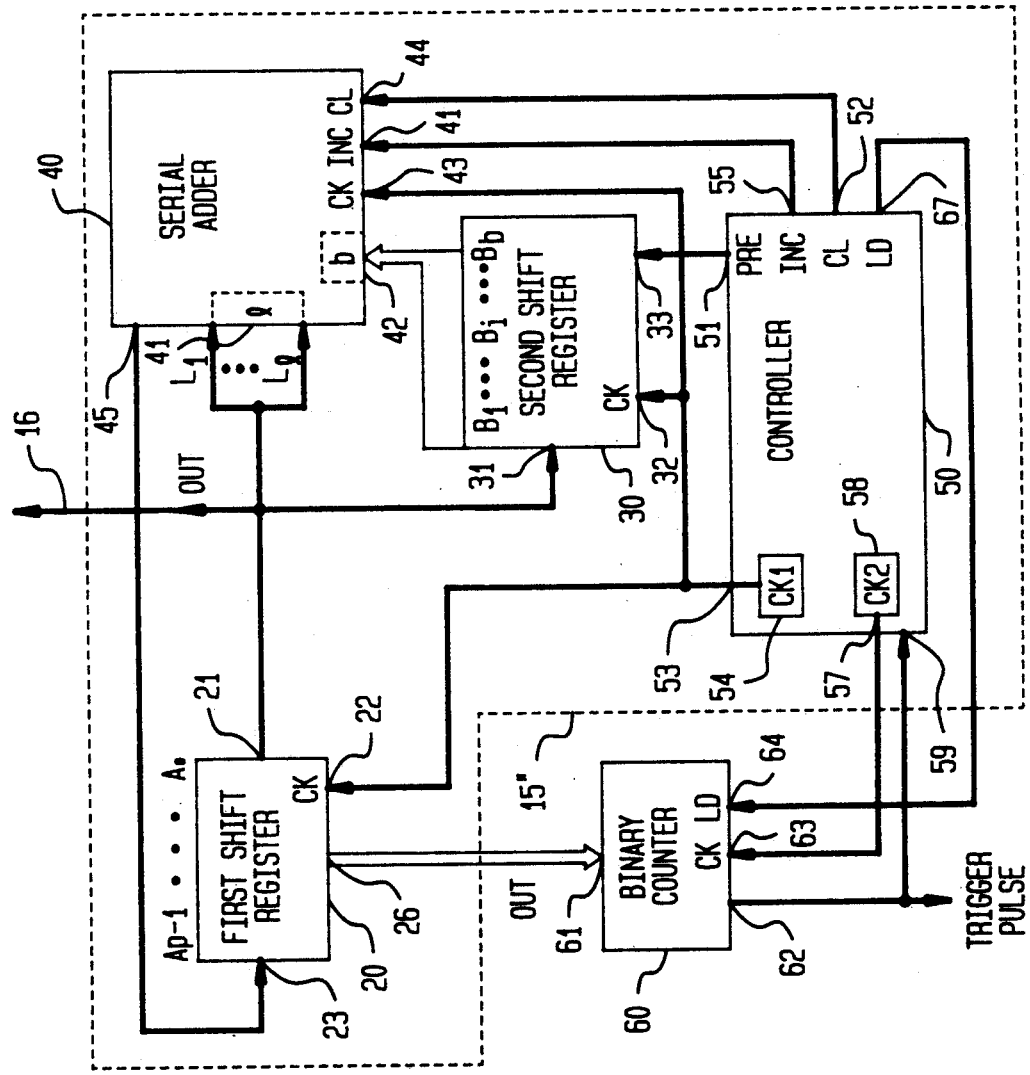
FIG. 5 is a schematic drawing of a pseudo-random clock generator in accordance with a third embodiment of the present invention.

This method of determining the value for c may be used to change the pseudo-random numbers that are generated. For example, the INC value can be readily changed. FIG. 5 is a schematic drawing of a pseudo-random clock generator according to a third embodiment of the present invention. As shown, the pseudo-random clock generator includes a pseudo-random number generator 15" and a binary counter 60.

Elements of pseudo-random number generator 15" in FIG. 5 are similar to the elements of pseudo-random number generators 15 and 15' of FIGS. 3 and 4, respectively, and like elements are identically numbered.

Pseudo-random number generator 15" includes a parallel output terminal 26 as shown in FIG. 4. Controller 50 includes a second clock 58 for generating a second clock signal CK2 for input to second clock output terminal 57. Controller 50 further includes trigger input terminal 59 for receiving a trigger pulse.

Binary counter 60 includes p parallel input terminals 61 and trigger pulse output terminal 62. Binary counter 60 further includes clock input terminal 63 and load input terminal 64.

The p parallel output terminals 26 of shift register 20 of pseudo-random number generator 15" are connected to p parallel input terminals 61 of binary counter 60. Trigger pulse output terminal 62 of binary counter 60 is connected to trigger input terminal 59 of controller 50. Load output terminal 67 of controller 50 is connected to the load input terminal 64 of binary counter 60. The second clock signal CK2 from second clock 58 of controller 50 is input to binary counter 60 by connecting the second clock signal output terminal 57 of controller 50 to the clock signal input terminal 63 of binary counter 60.

Controller 50 causes pseudo-random number generator 15" to generate a pseudo-random number that is output at parallel output terminals 26 of first shift register 20. This output is in response to a trigger pulse received at trigger pulse input terminal 59. The operation of pseudo-random number generator 15" is substantially the same as the two other embodiments that were discussed and shown at FIGS. 3 and 4.

The pseudo-random number generated and stored in first shift register 20 is output via parallel output terminals 26 to parallel input terminals 61 of binary counter 60 as a count value. Binary counter 60 counts out the value output from first shift register 20 in accordance with the CK2 signal from second clock 58 received at clock signal input terminal 63. The CK2 signal is synchronized with the first clock signal CK1 from first clock 54 of controller 50.

Binary counter 60 may be a down counter that counts from the count value output from first shift register 20 to zero and outputs a trigger pulse when the binary counter reaches the value of zero. Alternatively, binary counter 60 may be an up counter and may output a trigger pulse when it reaches the count value output from first shift register 20.

The trigger pulse from the system of the present invention may be used to trigger a test of a device after a random time interval determined by the count value. Further, the trigger pulse may be input to controller 50 at trigger pulse input terminal 59 in order to generate another random time interval for testing.

Additional advantages and modifications will readily occur to those skilled in the art. Second shift register 30 and associated circuitry may be eliminated when l is greater than zero and the multiplier "a" will become equal to 1. The invention in its broadest aspects is not, therefore, limited to the specific details, representative methods, and illustrative examples shown and described. Accordingly, departures may be made from such details without departing from the spirit or scope of Applicant's general inventive concept.

I claim:

1. A pseudo-random number generator comprising:
   first shift register with p stages for storing and shifting a value, with a least significant bit ("LSB") being adjacent an output terminal of the first shift register;
   second shift register with b stages for storing and shifting a preloaded value, with a LSB of the preloaded value being stored at the bth stage of the second shift register;
   serial adder having at least l input taps with the serial adder adding a value of predetermined length from a $L_1$ to $L_l$ value at the l input taps, with the $L_1$ to $L_l$ value being formed from the LSB of the value stored in the first shift register being shifted out of the first shift register to the l input taps, and at least a $B_i$ value of a $B_1$ to $B_b$ value stored in the second shift register, and loading a sum output of the serial adder into the first shift register; and
   controller for controlling clocking of the first and second shift registers, and the serial adder, controlling the loading of a preload value into the second shift register, and clearing of the serial adder.

2. The pseudo-random number generator according to claim 1, wherein the pseudo-random number generator determines a random number according to the expression:

$$X_{n+1} = (a*X_n + c) \text{ modulus } m$$

where,
$n \geq 0$
$X_0$ = starting value for X
a = multiplier
c = increment
m = modulus: $2^p$ with p being the number of stages of the first shift register and multiplier a is determined according to the expression:

$$a = 1 + \sum_{i=1}^{b} 2^i f(i)$$

where,
l = the number of input taps to the serial adder that receive the output from the first shift register
b = the number of stages of the second shift register $$f(i) = 1 \text{ if stage } B_i \text{ is connected to said serial adder}$$
$$= 0 \text{ otherwise}$$

where,
$B_i$ = a stage of the second shift register.

3. The pseudo-random number generator according to claim 1, where a multiplier is determined at least by the expression:

$$a = l + 2^b$$

where,
l = the number of input taps to the serial adder for the output from the first shift register
b = the number of stages of the second shift register 4. The pseudo-random number generator according to claim 1, wherein the first shift register further comprises a parallel output for the p stages.

5. A pseudo-random number generator according to claim 1, wherein the first shift register further comprises a serial input for storing an initial value.

6. The pseudo-random number generator according to claim 1, wherein the controller generates a reset signal and the first shift register further includes a reset for receiving the reset signal.

7. The pseudo-random number generator according to claim 1, wherein the controller generates a preload signal that is used as an increment value and the preload signal is received at the preload input of the second shift register.

8. The pseudo-random number generator according to claim 1, wherein the controller generates an increment signal representation of the increment value and is input to an increment input tap of the serial adder.

9. The pseudo-random number generator according to claim 1, wherein the controller generates a preload signal and an increment signal, with the increment signal being input to an increment input tap of the serial adder, and the preload signal being input to a preload input of the second shift register, and with increment value being the sum of the preload signal and the increment signal.

10. The pseudo-random number generator according to claim 1, wherein the controller further comprises a trigger input for triggering generation of a pseudo-random number.

11. A method of generating pseudo-random numbers in a system having at least a first shift register, second shift register, serial adder, and controller, with the first shift register being connected to the second shift register, the first and second shift registers being connected to the serial adder, and the controller being connected to the first and second shift registers, and the serial adder, the method comprising the steps of:
(a) generating a clock signal at the controller;
(b) preloading a value based on b stages;
(c) clearing serial adder with a signal from the controller;
(d) serially shifting contents of a lowest stage of a first shift register having p stages to a highest stage in the second shift register and to l input taps of the serial adder, while substantially simultaneously outputting contents of at least one stage of the second shift register means to at least another input tap of serial adder, in accordance with the clock signal;
(e) adding a value of predetermined length from a $L_1$ to $L_l$ value at l input taps of the serial adder, with the $L_1$ and $L_l$ value being formed from a least significant bit ("LSB") of the value stored in the first shift register that is shifted out of the first shift register, and at least a $B_i$ value of a $B_1$ to $B_b$ value stored in the second shift register that is shifted out of the second shift register, and outputting the result as the highest stage of the first shift register in accordance with the clock signal;
(f) repeating steps (d) and (e) for p−1 clock cycles; and
(g) outputting the value stored in the first shift register.

12. A method according to claim 11, further comprising the step of repeating the steps (b) to (f) in response to a trigger signal.

13. A method according to claim 11, further comprising the step of generating a trigger pulse based on counting from a predetermined value up to, or from a predetermined value down to, the value output from the first shift register.

14. A method according to claim 11, wherein step (f) further comprises repeating step (d) and (e) for p−1 clock cycles to multiply the value so that a step of multiplying the value in the first shift register is at least multiplying by $$l + \sum_{i=1}^{b} 2^i f(i)$$

where $f(i)$ = 1 if stage $B_i$ is connected to serial adder
     = 0 otherwise wherein $B_i$ is a stage of said secondary shift register means.

* * * * *